Dec. 14, 1948.  R. E. KROGH  2,456,129
VISOR DOCUMENT CLIP
Filed Jan. 30, 1948

INVENTOR
RALPH E. KROGH
BY Everett G. Wright
ATTORNEY

Patented Dec. 14, 1948

2,456,129

UNITED STATES PATENT OFFICE 2,456,129

VISOR DOCUMENT CLIP

Ralph E. Krogh, Detroit, Mich.

Application January 30, 1948, Serial No. 5,441

4 Claims. (Cl. 24—81)

This invention relates to improvements in document clips of the type employable on the visor of an automobile or elsewhere where convenient and firm anchorage of the document clip to a relatively flat structure is desirable.

The primary object of the invention is to provide a simply constructed and inexpensive document board which employs a novel resilient anchorage onto the automibile visor or the like that is automatically and positively effective upon telescoping the heel plate of the document clip onto the said visor.

Other objects of the invention will become apparent by reference to the following detailed description taken in connection with the accompanying drawing, in which.

Figure 1:
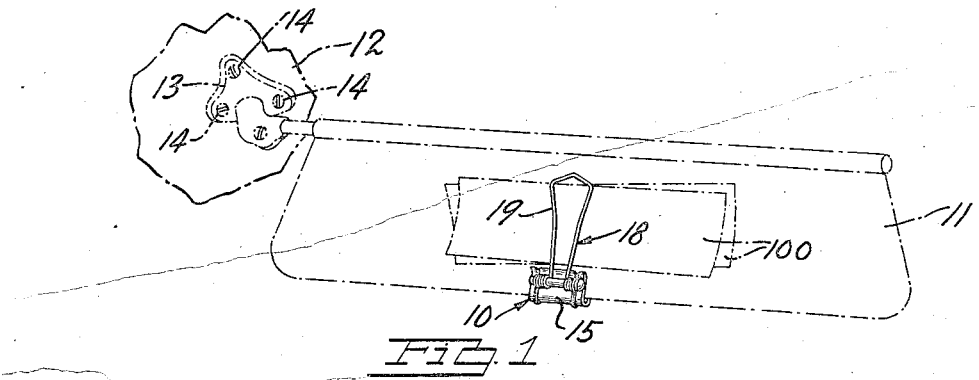
Fig. 1 is a view in perspective showing a document clip embodying the invention removably secured to an automobile visor, the said visor being indicated in dot and dash lines.
Figure 2:
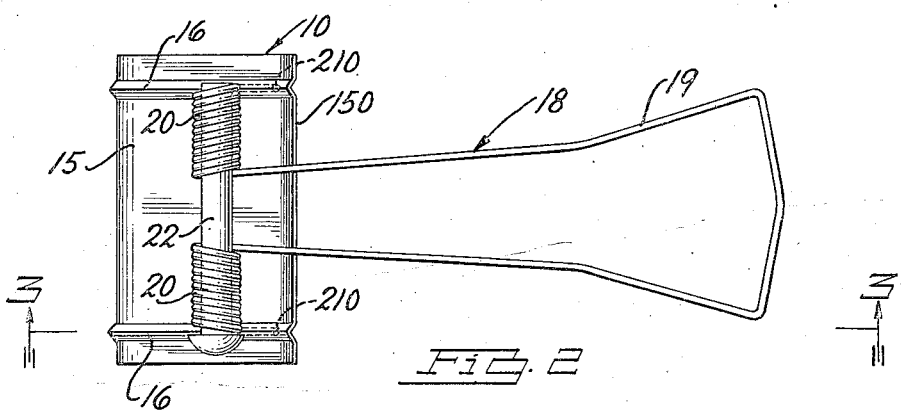
Fig. 2 is a top plan view of the embodiment of the invention disclosed in Fig. 1.

Referring now to the drawing wherein like numerals refer to like and corresponding parts throughout the several views, the document clip 10 illustrative of the invention is shown in Fig. 1 removably secured to an automobile visor 11 which is indicated to be mounted on the interior of the automobile body 12 by means of a bracket 13 and self tapping screws 14.

Figure 3:
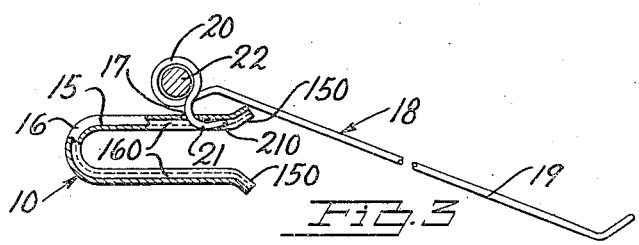
Fig. 3 is a longitudinal sectional view of the document clip taken on the line 3—3 of Fig. 2.

The said document clip 10 is composed of a somewhat resilient U-shaped heel plate 15 having a pair of laterally spaced V-shaped ribs 16 formed therein providing laterally spaced longitudinally disposed V-shaped grooves 160 along the interior of the said U-shaped heel plate 15. The outer ends of the said U-shaped heel plate 15 are flared outwardly at 150 to permit the said heel plate 15 to be telescoped readily onto the visor or the like 11. The said heel plate 15 is provided with a pair of apertures 17 through the top thereof centered over the said V-shaped ribs 16, which apertures are preferably located slightly rearwardly from the upper outwardly flared end 150 of the said heel plate 11. A resilient spring wire clip 18 is formed into a document engaging arm 19, a pair of coiled spring elements 20 and anchorage loops 21, also, if desired a pin 22 may be employed through the said coiled spring elements 20 to maintain the said coiled spring elements 20 in alignment. The clip 18 is assembled to the heel plate 15 by inserting the ends 210 of the anchorage loop 21 through the apertures 17 in the top of the said heel plate 15. The clip 18 is indicated in Fig. 3 in its unsprung state wherein the extreme ends 210 of the anchorage loop 21 are positioned into the longitudinal V-shaped grooves 160 of the heel plate 15 and the coiled spring elements 20 or disposed in vertical spaced relationship above the top of the said heel plate 15.

Figure 4:
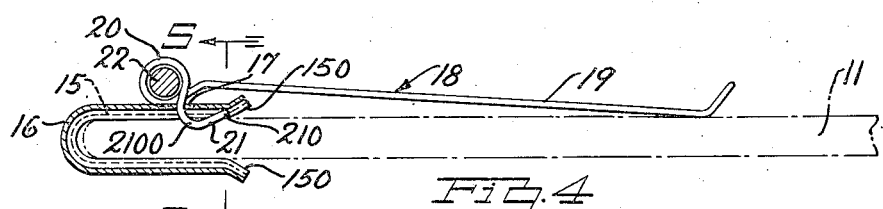
Fig. 4 is a longitudinal sectional view of the document clip similar to Fig. 3 except that the document clip is shown applied to a visor or document board, the said visor or document board being indicated in dot and dash lines.
Figure 5:
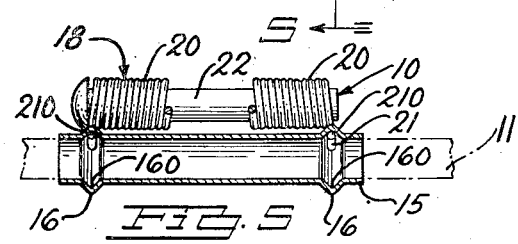
Fig. 5 is a transverse sectional view taken on the line 5—5 of Fig. 4.

When the document clip 10 is applied to an automobile visor or the like 11, the heel plate 15 is telelscoped over the edge thereof. When applying the heel plate 15 to the visor 11, the document engaging arm 19 is lifted counter-clockwise from its position as viewed in Fig. 3 and is permitted to spring against the visor 11 after the telescoping of the said heel plate 15 thereon as indicated in Fig. 4. It will be noted that this lifting of the document engaging arm 19 counterclockwise from its unsprung position shown in Fig. 3 moves the anchorage loops 21 of the clip 18 further through the apertures 17 in the top of the heel plate 15 forcing the anchorage loop 21 to assume an attitude whereby the central portions 2100 of each anchorage loop 21 become pressure points against the visor 11 whereby to firmly engage and anchor the document holder 10 to the said visor 11. Obviously, the more documents 100 that are placed under the document engaging arm 19, the higher the outer end of the said document arm 19 will be lifted and the greater will be the anchorage pressure of the anchorage loops 21 against the visor 11.

Although but one embodiment of the invention has been disclosed and described in detail, it is obvious that many changes may be made in the size, shape, arrangement and detail of the invention without departing from the spirit and scope thereof as defined by the appended claims.

I claim:

1. A document clip for automobile visors and the like comprising a U-shaped heel plate having a pair of laterally spaced apertures therein near the open end thereof, a spring wire document engaging arm including a pair of laterally coiled spring elements at the inner end thereof, each coiled spring element including an arcuate anchorage loop at the end thereof disposed substantially parallel to the document engaging arm positioned through the said apertures in the said U-shaped heel plate with the ends of the said loops in contact with the inside of the said U-shaped heel plate whereupon the said document engaging arm assumes a position diagonally across the open end of the said U-shaped heel plate, the said anchorage loops contacting and engaging the automobile visor and anchoring the said document clip thereto when the said heel plate is telescoped over the edge of the said visor and the document engaging arm is sprung against the face of the said visor.

2. A document clip for automobile visors and the like comprising a U-shaped heel plate having a pair of laterally spaced ribs therein forming interior grooves and having a pair of laterally spaced apertures therein at the base of the said grooves near the open end thereof, a spring wire document engaging arm including a pair of laterally coiled spring elements at the inner end thereof, each coiled spring element including an arcuate anchorage loop at the end thereof disposed substantially parallel to the document engaging arm positioned through the said apertures in the said U-shaped heel plate with the ends of the said loops disposed in the said grooves in contact with the inside of the said U-shaped heel plate whereupon the said document engaging arm assumes a position diagonally across the open end of the said U-shaped heel plate, the said anchorage loops contacting and engaging the automobile visor and anchoring the said document clip thereto when the said heel plate is telescoped over the edge of the said visor and the document engaging arm is sprung against the face of the said visor.

3. A document clip for automobile visors and the like comprising a U-shaped heel plate outwardly flared at its open end having a pair of laterally spaced apertures therein near the flared open end thereof, a spring wire document engaging arm including a pair of laterally coiled spring elements at the inner end thereof, a pin disposed through the said coiled spring elements maintaining the said coiled spring elements in transverse alignment, each coiled spring element including an arcuate anchorage loop at the end thereof disposed substantially parallel to the document engaging arm positioned through the said apertures in the said U-shaped heel plate with the ends of the said loops in contact with the inside of the said U-shaped heel plate whereupon the said document engaging arm assumes a position diagonally across the open end of the said U-shaped heel plate, the said anchorage loops contacting and engaging the automobile visor and anchoring the said document clip thereto when the said heel plate is telescoped over the edge of the said visor and the document engaging arm is sprung against the face of the said visor.

4. A document clip for automobile visors and the like comprising a U-shaped heel plate outwardly flared at its open end having a pair of laterally spaced ribs therein forming interior grooves and having a paid of laterally spaced apertures therein at the base of the said grooves near the flared open end thereof, a spring wire document engaging arm including a pair of laterally coiled spring elements at the inner end thereof, a pin disposed through the said coiled spring elements maintaining the said coiled spring elements in transverse alignment, each coiled spring element including an arcuate anchorage loop at the end thereof disposed substantially parallel to the document engaging arm positioned through the said apertures in the said U-shaped heel plate with the ends of the said loops disposed in the said grooves in contact with the inside of the said U-shaped heel plate whereupon the said document engaging arm assumes a position diagonally across the open end of the said U-shaped heel plate, the said anchorage loops contacting and engaging the automobile visor and anchoring the said document clip thereto when the said heel plate is telescoped over the edge of the said visor and the document engaging arm is sprung against the face of the said visor.

RALPH E. KROGH.

No references cited.